Feb. 9, 1960 H. H. ARMSTRONG ET AL 2,923,992
SEALING CLOSURE
Filed Aug. 15, 1955 3 Sheets-Sheet 2

INVENTORS
HOWARD H. ARMSTRONG
CARROLL P. KRUPP
BY Dwight L. Moody
ATTY.

United States Patent Office — 2,923,992 — Patented Feb. 9, 1960

2,923,992
SEALING CLOSURE

Howard H. Armstrong and Carroll P. Krupp, Cuyahoga Falls, Ohio, assignors to The B. F. Goodrich Company, New York, N.Y., a corporation of New York Application August 15, 1955, Serial No. 528,153

7 Claims. (Cl. 24—205.1)

The invention relates to a closure for sealing adjacent margins and especially to flexible sealing closures including slide fastener structures capable of sealing especially against water, air and other fluids.

The sealing end closure and top stop construction described and shown in this application is claimed in a co-pending application of Howard H. Armstrong, Serial No. 529,621, filed August 22, 1955; now U.S. Patent No. 2,800,699.

Heretofore, slide fastener structures have had flexible closing elements or strips with opposed, vertical and flat or curved surfaces in abutment for resisting the passage of air and/or water through the fastener structure, the lateral pressure of one closing element toward and against the other closing element being relied on to maintain the abutment of said surfaces in a plane perpendicular to a face of the structure and thus maintain the seal. Nevertheless, it has been found that such fastener structures lose their seal and leak objectionably, when subjected to localized flexing or sharp bending and/or twisting, because the opposed abutting surfaces separate and open-up at one or more zones along the fastener structure.

Other slide fastener structures have had elastic closing elements or strips utilizing the lip-action flexure principle to provide sealing action of the fastener structure. Such sealing slide fastener structures are described and claimed in the Carroll P. Krupp Patent No. 2,545,817. In these fastener structures, the closing elements mounted on the attaching margins extend laterally in a horizontal plane generally parallel to a face of the structure and overlie the teeth in overlapping contacting relation one to the other but spaced at least in part from the teeth, and the sealing is effected at a sealing surface on one closing element relatively slightly inclined to the face of the structure. While this construction has been found to give good results, the slide fastener structure may be manipulated under some relatively abnormal and severe conditions of flexure so that there is a tendency for the lip portions of the closing elements to part and lose their sealing action.

An object of the invention is to provide an improved sealing closure, especially a flexible slide fastener sealing closure, having increased reliability of the seal under all conditions of flexure encountered in use and utilizing to a maximum the advantages of both the lateral pressure abutment sealing principle and the lip-sealing principle.

Other objects of the invention are to provide for closing and sealing effectively adjacent separable margins under zero fluid pressure conditions at one or both faces of the margins and also under fluid pressure differential conditions with the greatest pressure at either face of the margins; to provide for effecting sealing in a plane relatively steeply i.e. acutely inclined to a face of the margins of the closure but substantially less than perpendicular to said face of the margins; to provide for relative sliding movement of contacting inclined sealing and seating surfaces while maintaining lateral pressure of one surface against the other surface at their abutting area; to provide for maintaining the lip-end portion of one closing or sealing element elastically flexed in contact with a steeply inclined seating surface of the other closing or sealing element; to provide for maintaining the seal of the closure despite relative hinging movement of the engaged slide fastener elements and for resisting objectionable hinging movement of said fastener elements; and to provide for simplicity of construction, convenience of manufacture and for effectiveness of operation and of sealing.

Further objects are to provide for positively guiding the closing or sealing elements into slidable contacting relation one to the other during the engaging of the fastener elements; to provide for preventing separation and lifting of the closing elements relative to the fastener elements under flexure and twisting of the closure as a whole and also locally thereof; to provide for securely attaching the closing elements to a face of the fastener elements along the major part of the length of each fastener element; and to provide for an initial angular interference relationship of the inclined sealing and seating surfaces of the closing elements.

These and other objects and advantages of the invention will be apparent from the following description.

In the accompanying drawings which form a part of this specification and in which like numerals are employed to designate like parts throughout the same.

In the embodiment of the invention shown in Figs. 1 to 12, inclusive, the sealing closure has joining means, preferably a slide fastener structure, detachably uniting adjacent flexible margins 20, 21 of a manufactured article, and has a pair of flexible sealing elements or strips 22, 23, preferably of elastic material, for closing the margins 20, 21 against the passage of fluid i.e. a liquid or a gas, and of other flowable foreign material therebetween. The slide fastener structure includes a pair of flexible attaching margins or stringers 24, 25 which may be made of square-woven, knitted or other suitable textile fabric of cotton, nylon, rayon, silk, glass fiber, or other suitable filamentary material. The stringers have beaded edge portions 26, 27 upon which are mounted cooperating fastener elements or teeth 28, 29 of known construction and hard, stiff material such, for example, as brass or bronze, aluminum alloy, steel or other suitable metal, or a rigid nylon or other suitable strong, heat-resistant plastic material.

Figures 3, 4:
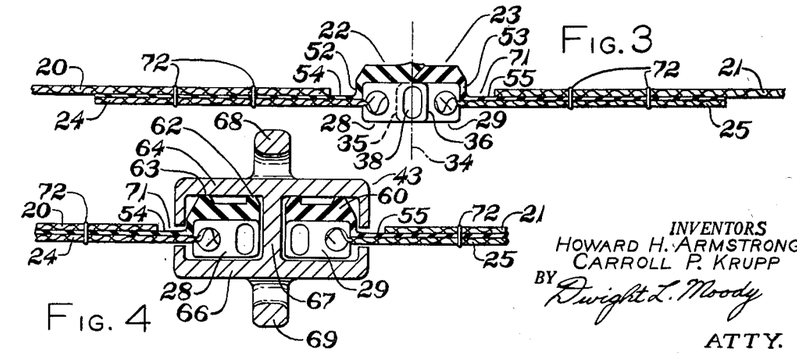
Fig. 3 is a sectional view taken along line 3—3 in Fig. 1.
Fig. 4 is a sectional view taken along line 4—4 in Fig. 1.
Figure 11:
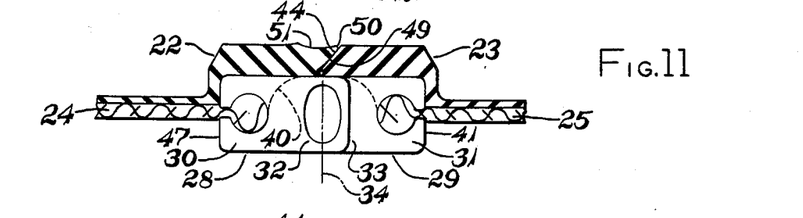

The teeth 28, 29 are disposed spaced-apart in series along each stringer and each of the teeth 28, 29 includes a mounting portion 30, 31 immediately at the beaded edge portion 26, 27 and an engaging portion 32, 33 projecting therefrom. The engaging portions 32, 32 of the teeth 28, 28 on one stringer 24 are positioned in the spaces between and overlap the engaging portions 33, 33 of the teeth 29, 29 on the other stringer 25, and also contact and detachably interlock with the engaging portions 33, 33 along the longitudinal center line i.e. median line of engagement, indicated by the numeral 34, of the slide fastener structure in its closed condition as shown in Figs. 3 and 11. The median line 34 is located laterally inward of and substantially equally spaced from the free ends 35, 36 of each of the engaged teeth 28, 29, and is located centrally of the interlocking contact area 37, 38 of the engaging portion 32, 33 of each of the engaged teeth 28, 29. The center line of the interlocking contact area 38 of the engaging portion 32 of each of the teeth 28 is indicated by the numeral 34a, and the center line of the interlocking contact area 37 of the engaging portion 33 of each of the other teeth 29 is indicated by the numeral 34b, as shown especially in Fig. 8.

Figure 12:
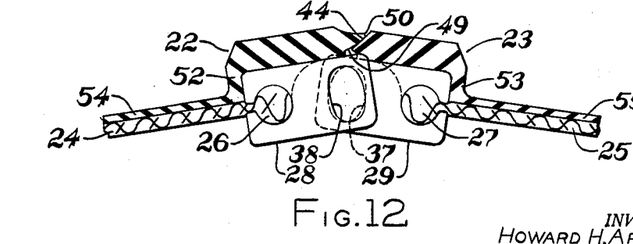
Fig. 12 is a view like Fig. 11 but showing the sealing closure in the closure condition with the slide fastener teeth in hingedly inclined relation one to the other.

When the slide fastener structure is changed from the open condition to its closed condition by suitable operation of a slider 43 of bronze or other suitable metal or rigid plastic, the teeth 28, 29 on the respective fabric stringers 24, 25 are drawn laterally toward one another such that the engaging portions 32, 33 laterally overlap one another a continuously increasing extent until they are fully overlapped and in the interlocking contacting relationship shown in Figs. 3 and 11, the successive stages of engagement of the engaging portions 32, 33 being shown in Figs. 8 to 11, inclusive. During the foregoing engaging operation, the center lines 34a and 34b of the respective interlocking contact areas 37 and 38 of the engaging portions 32, 33 move laterally toward one another from their spaced-apart relation for the open condition until they merge together for the closed condition. When the engaging portions are fully overlapped and interlocked, the merged center lines 34a, 34b coincide with the median line 34 of the closed slide fastener structure as shown in Fig. 11, which median line is also the neutral axis of relative hinging movement of the teeth as shown in Fig. 12.

The flexible sealing elements 22, 23 of impervious elastic material are desirably made of resilient rubber, natural or synthetic, or other elastic rubber-like material or elastic thermoplastic material suitable for the intended purpose and capable of being extruded, or molded, or otherwise formed to shape, and also capable of being securely adhered or bonded as by a suitable rubber cement, or otherwise attached to the teeth 28, 29 of the slide fastener structure. Both sealing elements 22, 23 extend longitudinally in continuous strip form at a face of the attaching margins or fabric stringers 24, 25, and are mounted not only on the fabric stringers but also mounted on corresponding faces (upper faces as shown) of the teeth 28, 29, so as to overlap and overlie the mounting and the engaging portions of the teeth at said face of the stringers.

In the preferred construction, the sealing elements are made of resilient natural or synthetic rubber composition, and are molded upon and adhesively bonded as by a suitable rubber cement to the said faces of the teeth. Each space between the engaging portions 32, 32 of adjacent teeth 28, 28, and between the engaging portions 33, 33 of adjacent teeth 29, 29 is substantially free of the rubber material of the sealing elements to permit engagement of the teeth. However, the rubber material of the molded sealing elements 22, 23 may occupy the spaces between the mounting portions 30, 31 of adjacent teeth at said face of the stringers, but does not extend in the spaces laterally beyond the inward positions at the beaded edges 26, 27 shown by broken lines indicated by the numerals 39, 40 in Fig. 8. This arrangement facilitates maintaining the alignment of the teeth with little or no hindrance to the engagement and interlocking of the teeth.

Figure 8:
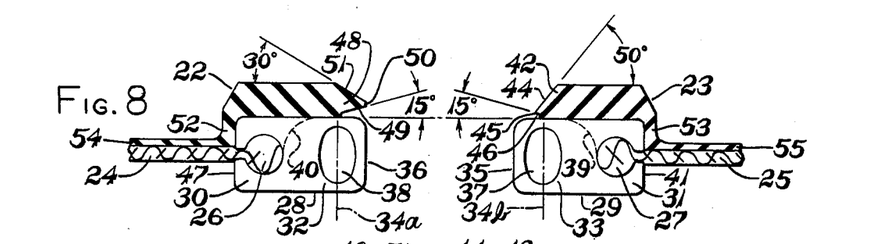
Fig. 8 is a cross-sectional view in an enlarged scale of parts of the sealing closure or assembly shown in Fig. 2, the closure being shown in the open condition.

The sealing element 23 against which the other sealing element 22 seats, extends laterally of the closure i.e. lengthwise of the teeth 29, 29 from their outer or attached end 41 to at least the position of the center line 34b and preferably to a position slightly beyond or in advance of the center line 34b. A relatively narrow, flexure-resistant, tapered marginal portion 42 of the sealing element 23 overlies and extends laterally along a central zone of the interlocking contact area 37 of the engaging portion 33 of the teeth 29, and terminates at a position short of and substantially spaced from the free end 35 of the teeth 29, 29 but beyond the center line 34b, as shown in Fig. 8, to facilitate the provision of the desired amount of lateral interference hence lateral abutting pressure of the sealing elements against one another in the closed condition of the fastener. The lower face of the sealing element 23 is adhesively attached or bonded to the adjacent face of the mounting portion 31, and desirably but not necessarily bonded to the adjacent face of the engaging portion 33 of each of the teeth 29. When not bonded to the engaging portion 33, the lower face of the sealing element 23 is arranged closely spaced and adjacent the engaging portion 33 and thereby adapted to be backingly supported by the engaging portion 33. For the molded construction, it is preferred to have the sealing element 23 bonded continuously across its width to at least the position of the center line 34b, hence the median line 34 of the slide fastener structure, to provide for lateral overlapping of the sealing elements and for effective sealing of the closure.

The sealing element 23 may have a flat upper face rearward of the marginal portion 42, and may have an outwardly extending, inwardly inclined outer side face for slider clearance purposes at the attached or outer end 41 of the teeth 29. It may also have, between the outer side face and the tapered marginal portion 42, a uniform thickness which preferably is substantially less than the height of the teeth 29, yet sufficient stiffness to resist objectionable distortion, lifting and laterally outward yielding of the sealing element 23.

The inner side face of the sealing element 23, that is, the upper face of the tapered marginal portion 42, constitutes a smooth, planar, continuous seating surface 44 for contacting the other sealing element 22. The continuous seating surface 44 overlies the interlocking contact area 37 of the teeth 29 and extends laterally outward and upwardly inclined with its major part to one side of a vertical plane passing through the center line 34b, hence to one side of the median line 34; and also extends at an acute angle not exceeding about 60° to the horizontal plane of the upper faces of the teeth 29, 29 and to the adjacent face of the stringer 25. The marginal portion 42 at its lower inner end region adjacent and at the other side of said vertical plane or center line 34b terminates in a resilient tapered end part having a thin sharp edge 45 which is intersected by the inclined seating surface 44. The marginal portion 42 has preferably a relatively narrow or short under face 46 extending inwardly and upwardly inclined (for example, about a 15° angle) relative to the upper faces of the teeth 29, 29 and extending from a position closely adjacent and slightly in advance of the center line 34b to the sharp edge 45 to provide for limited clearance space beneath the resilient tapered end part of the marginal portion 42, whereby limited and controlled elastic deformation and flexure of the said resilient tapered end part may occur as for accommodating the closed contacting disposition of the sealing elements shown especially in Fig. 11.

Figures 5, 6, 7, 13:
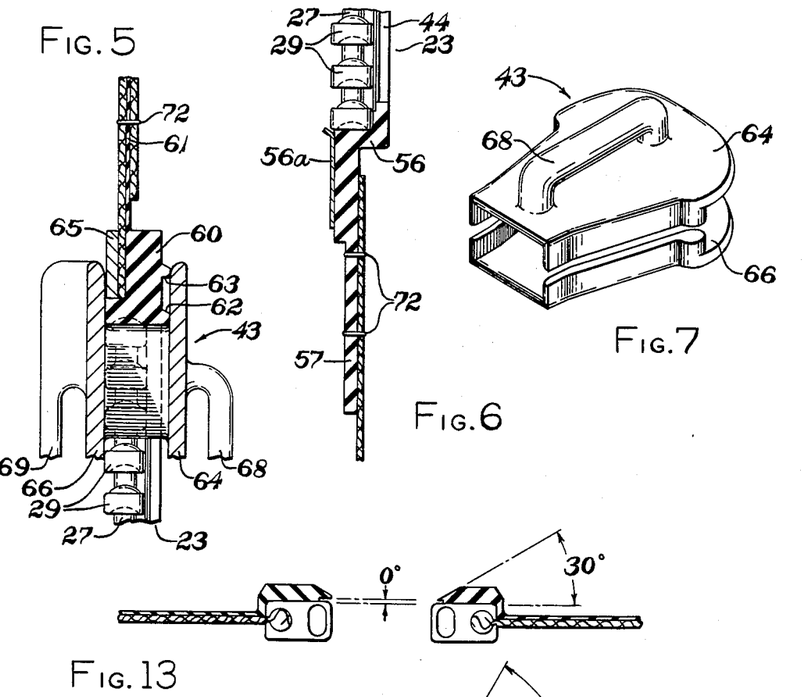
Fig. 5 is a sectional view taken along line 5—5 in Fig. 1.
Fig. 6 is a sectional view taken along line 6—6 in Fig. 1.
Fig. 7 is a perspective view from above of a slider for the sealing slide fastener closure.
Figs. 13, 14 and 15 are views like Fig. 8 but in reduced scale showing modified constructions of the sealing elements of the closure.
Figure 14:
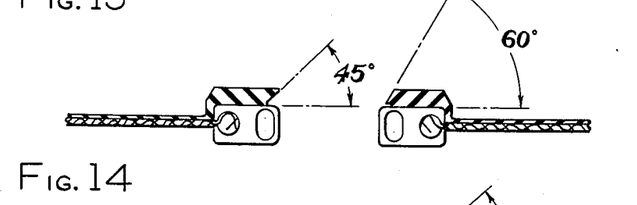
Figure 15:
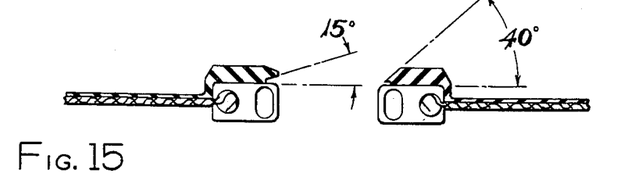

It has been found that the said acute angle of inclination of the seating surface 44 may vary within the range of from not less than 30° to a maximum of about 60°, as shown in the modified constructions illustrated in Figs. 13, 14 and 15. In the preferred construction shown in Figs. 1 to 12, good results have been obtained using an acute angle of inclination of 50° for the seating surface 44. This facilitates effective cooperation with the other sealing element 22 to produce improved fluid-tight, especially water-tight, sealing of the closure by lip-action flexure and also lateral abutting pressure of the sealing elements.

The other sealing element 22 is mounted directly upon the teeth 28, 28 in a manner substantially similar to that of the sealing element 23 upon the teeth 29, 29. The sealing element 22 extends laterally of the closure from the outer or attached end 47 of the teeth 28, 28 to the free end 36 of the engaging portions 32, 32 and terminates in a relatively narrow, flexible, tapered marginal portion 48, preferably of lesser cross-section and greater flexibility than that of the marginal portion 42. The marginal portion 48 projects laterally toward the other sealing element 23 in overlying spaced-apart relation to the engaging portions 32, 32 of the teeth 28, 28 from approximately the position of the center line 34a to substantially the free end 36 of the teeth. This provides for lateral interference i.e. overlapping the "as molded" or normal position of the marginal portion 48 with the "as molded" or normal position of the marginal portion 42 to a desired determinate amount, hence overlapping of the marginal portions 48, 42 when the teeth are engaged; and also facilitates continuous and firm contact of the marginal portion 48 directly against the seating surface 44 of the sealing element 23 in the closed condition of the closure. The lower face of the sealing element 22 is adhesively attached or bonded to the adjacent face of the mounting portion 30, and desirably but not necessarily bonded to the adjacent face of the engaging portion 32 of each of the teeth 28 to at least the position of the center line 34a or slightly in advance of the center line 34a, as shown in Fig. 8. When not bonded to the engaging portion 32, the lower face of the sealing element 22 is arranged closely spaced and adjacent to and adapted to be backingly supported by the underlying engaging portion 32. For the molded construction, it is preferred to have the sealing element 22 bonded continuously across its width to at least the position of the center line 34a.

The sealing element 22 at its body portion rearward of its marginal portion 48, may have a flat upper face, and may have an outwardly extending, inwardly inclined outer side face for slider clearance purposes at the outer end 47 of the teeth 28. It may also have, between the outer side face and the tapered marginal portion 48, a uniform thickness substantially less than the height of the teeth 28 yet sufficient stiffness to resist objectionable distortion, lifting and laterally outward yielding of the sealing element 22. The flat upper faces of the sealing elements 22 and 23, respectively, desirably lie in substantially the same horizontal plane in the open and closed conditions of the closure to reduce the overall thickness of the closure and to facilitate manipulation of the slider 43 for opening and closing purposes.

The tapered marginal portion 48 provides at its lower face a continuous sealing surface 49 of smooth planar configuration extending from a position closely adjacent and slightly in advance of the center line 34a to substantially the position of the end 36 of the teeth 28, 28 and extending laterally in overlying, spaced-apart, outwardly inclined relation to the adjacent underlying parts of the engaging portions 32, 32, whereby the sealing surface 49 is inclined in the same direction away from and disposed to the same side of the median line of engagement 34 as is the seating surface 44. The sealing surface 49 has an angular relation to the acutely inclined seating surface 44 in the open condition of the closure as shown in Fig. 8, so that there is provided angular interference between the sealing and the seating surfaces 49, 44 in order to obtain initial contact of the surfaces and also subsequent follow-through contact of the surfaces as required under relative angular or hinging movement of the engaged teeth 28, 29 as shown especially in Fig. 12.

The sealing surface 49 is not only inclined outwardly and upwardly in the same lateral direction as the seating surface 44, but is angularly inclined relative to the horizontal plane of the upper faces of the teeth 28, 28 and of the adjacent face of the stringer 24 within the range of from not less than 0° to not more than about 45°. By virtue of this arrangement, the range of said angular interference is within the range of from not less than about 15° to not more than about 35°.

In the preferred construction having the 50° inclined seating surface 44, the sealing surface 49 has an angle of inclination of 15° as shown in Fig. 8, whereby the angular interference of the said surfaces 44, 49 is 35° (50°−15°=35°). This preferred arrangement produces effective initial contact and subsequent follow-through contact of the sealing elements 22, 23 and effective sealing under flexure and/or hinging movement of the slide fastener structure.

Figs. 13, 14 and 15 show modified embodiments having other angular inclinations of the sealing surface and other angular interferences between the sealing surface and the seating surface, all within the ranges discussed hereinabove.

The sealing surface 49 extends to and intersects a thin, relatively blunt, desirably flat edge 50 at the free end of the tapered marginal portion 48. The tapered marginal portion 48 has its upper face 51 intersecting the flat edge 50 and extending outwardly and upwardly inclined therefrom but oppositely inclined relative to the sealing surface 49. In the preferred construction the upper face 51 is inclined at an angle of 30° relative to the upper faces of the teeth 28, 28 and to the adjacent face of the stringer 24. The construction and arrangement provides sufficient resilient rubber material in the relatively narrow, tapered marginal portion 48 to produce inherent resilient resistance in the portion 48 to flexure and to elastic deformation of its normal shape shown in Fig. 8, whereby the tapered marginal portion 48 resiliently presses the edge 50 laterally against the seating surface 44 in slidable relation thereto, that is, effecting lip-action sealing, and also resiliently and laterally presses the sealing surface 49 into full continuous, abutting contact against the seating surface 44, that is, effecting lateral abutment pressure sealing, as shown especially in Fig. 11, for the closed condition of the closure.

Relatively thin, impervious, end walls 52, 53 of suitable resilient rubber material are bonded to the outer end faces of the teeth, and are integral with and extend in continuation of the material of the sealing elements 22, 23, and extend to the fabric stringers 24, 25. Each of the stringers desirably has a thin impervious layer 54, 55 of suitable resilient rubber material suitably adhered to a face thereof and merging with one of the end walls 52, 53 in the manner shown especially in Fig. 8, for sealing and attachment purposes.

Figure 2:
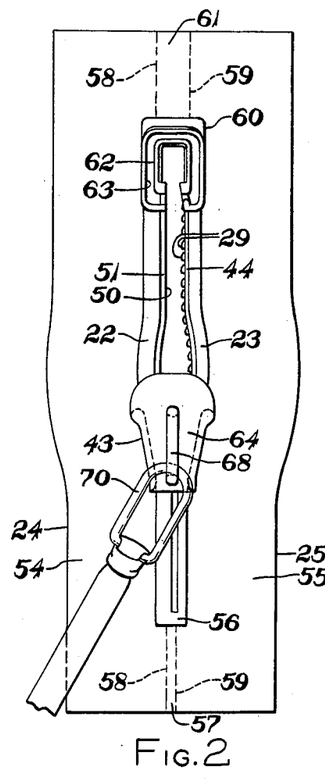
Fig. 2 is a plan view of a sealing slide fastener structure or assembly before its attachment to the wall and in a partially open condition.

The length of sealing slide fastener structure preferably produced as an individual assembly as shown in Fig. 2, has the ends of the sealing elements 22, 23 at the lower or closed end of the structure joined together by a laterally extending body or block 56 of suitable resilient rubber material and a height equal to that of the sealing elements, integrally united with the sealing elements as shown in Figs. 2 and 6. The parts of the sealing surface 49 and the seating surface 44 immediately at the end block 56 are in overlapping, contacting, adhered sealing relation one to the other. A suitable metal end stop 56a underlies the block 56 and is mounted upon the other face of the stringers 24, 25 in engaged relation thereto. A thin web 57 of suitable resilient rubber material spans the space between adjacent edges 58, 59 of the stringers 24, 25 at their lower end portions and is in continuation of the rubber material of the impervious layers 54, 55 and of the end block 56.

The sealing slide fastener assembly at its upper or open end may have the sealing elements joined by means of suitable known end constructions, but for best results it is preferred to join the sealing elements by the particular sealing end closure and top stop 60 construction shown in Figs. 1, 2, 4 and 5. A thin web 61 of suitable resilient rubber material spans the space between the adjacent edges 58, 59 of the stringers 24, 25 at their upper end portions, and is in continuation of the rubber material of the layers 54, 55 and of the top stop means 60.

The construction of the sealing end closure and top stop 60 will be described only briefly herein inasmuch as it will be fully described and claimed in the said copending application of Howard H. Armstrong. The top stop means 60 as molded has a generally U-shaped-in-plan body of suitable resilient rubber material and substantially uniform thickness mounted upon and spanning the spaced-apart fabric stringers 24, 25, the ends of the legs of the U-shaped body being integrally united with and in smooth continuation of the upper ends of the sealing elements 22, 23. The flat upper face of the U-shaped body has projecting therefrom a pair of similarly upraised and narrow, continuous sealing ribs 62, 63 extending in spaced-apart parallel relation one to the other along each of the legs and then across the base of the U and having sufficient increased height relative to that of the sealing elements to seat in a compressed upright condition against the flat inner face of a channeled upper plate 64 of the slider 43 to provide a multiple or labyrinth compression seal in continuation of the longitudinal seal of the sealing elements 22, 23. A bridge type stop 65 of suitable metal such as bronze or brass is mounted beneath the base of the U of the body and at the other face of the stringers in engaged relation to the latter, as shown in Fig. 5. The arrangement prevents movement of the slider beyond the desired location at the top or open end of the sealing slide fastener structure, and also provides an effective seal at such end of the structure.

The slider 43 construction shown in Fig. 7 includes the channeled upper plate 64, a channeled lower plate 66 having a flat inner face in overlying spaced-apart substantially parallel relation to a corresponding flat inner face of the upper plate, and a spreader post 67 of generally tear-drop shape-in-section extending between and integral with the upper and lower plates. Each plate has dependent guide flanges along the straight diverging sides of its tapered front portion but none along its rounded rear portion. The arrangement provides for the lower plate 66 closely and slidably embracing the exposed parts of the teeth 28, 29 at the other face of the stringers, and for the upper plate 64 closely and exteriorly embracing the sealing elements 22, 23 in their engaged condition and in slidable relation to said sealing elements. Each plate on its outer face may have a suitable projection 68, 69 to which may be attached a leather or fabric thong and metal ring 70 for manipulating the slider.

Figure 1:
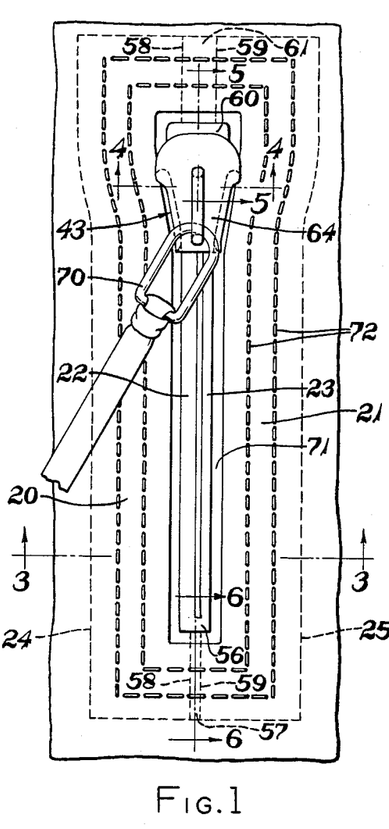
Fig. 1 is a plan view of a sealing slide fastener closure in the wall of an article and constructed in accordance with and embodying the invention, parts being broken away.

The fabric and rubber parts of the sealing slide fastener assembly shown in Fig. 2 may be integrally united as by vulcanization under heat and pressure. The assembled length of sealing slide fastener structure shown in Fig. 2 can be mounted upon the adjacent flexible margins 20, 21 extending along the elongated opening 71 in the wall of the article to be closed, as shown in Fig. 1. The fabric stringers 24, 25 may be positioned, impervious layers 54, 55 first, against the inner face of the wall of the article, that is, the face subject to lesser, or little or no fluid pressure as compared to that at the other or outer face of the wall, and may be sealingly attached to the wall and its flexible margins 20, 21 as by a suitable rubber cement of the air-curing type, or by rows of stitches 72, 72, or by both. The flexible sealing elements 22, 23 are disposed in the opening 71 in the wall and are positioned at the outer or pressure face of the wall, so as to close the opening 71 therein against the passage of fluid such, for example, as water, or air or other gas, especially against the passage of such fluid from the outside of the article to the inside of the latter.

In describing the operation of the sealing closure shown in Fig. 1, it is assumed that the closure is in its open condition with the teeth 28, 29 and the sealing elements 22, 23 disengaged and separated in the manner shown at the upper region of the sealing slide fastener assembly shown in Fig. 2. The slider 43 is slidably moved along the sealing slide fastener structure from its closed end to its open end and the top stop means 60 to close the opening 71 between adjacent margins 20, 21 by virtue of the resulting engagement of the slide fastener teeth and the sealing elements. Since the slider 43 embraces the outside of the flexible sealing elements 22, 23 at the outer face of the margins 20, 21 and the outside of the teeth 28, 29 at the inner face of the margins 20, 21, longitudinal movement of the slider towards and to the top stop means 60 compels progressive lateral movement of the teeth and the sealing elements inwardly away from their substantially separated position as they pass within and through the slider, and draws them together until they are arranged in their fully engaged contacting disposition shown in Figs. 1, 3 and 11. The sealing end closure and top stop means 60 prevents further longitudinal movement of the slider. The upraised sealing ribs 62, 63 of the means 60 are each in a compressed condition and are each pressed sealingly against the inner flat face of the upper plate 64 of the slider so as to continue the seal of the sealing elements at the open end of the closure, when the slider 43 reaches the end position shown in Figs. 1, 4 and 5, and its upper plate 64 overlies and embraces the top stop means 60. Movement of the slider 43 along the closure in the direction away from its open end and the top stop means 60 disengages the teeth and separates the sealing elements thus placing the closure in its open condition.

Figure 9:
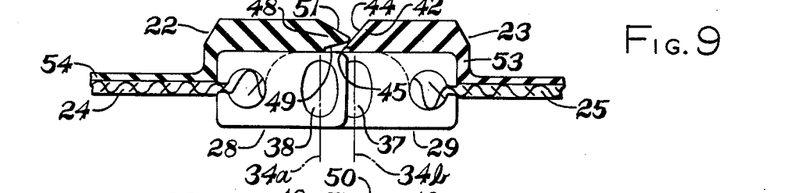
Figs. 9, 10 and 11 are views like Fig. 8 but showing progressive successive stages of closing engagement of said parts of the sealing closure.

The progressive lateral drawing together and overlapping engagement of the teeth 28, 29 and the sealing elements 22, 23 by the functioning of the slider 43, is shown in successive stages in Figs. 8, 9, 10 and 11. The sealing elements and the teeth with their associated fabric stringers are shown in Fig. 8 in the open, disengaged and relatively widely spaced-apart position. The initial contact of the sealing element 22 against the seating surface 44 of the other sealing element 23 and the initial overlapping engagement of the engaging portions 32, 33 of the teeth 28, 29 is shown in Fig. 9. It will be noted that the blunt flat edge 50 of the tapered marginal portion 48 is just contacting the inclined seating surface 44 at a position slightly above the sharp edge 45 of the other tapered marginal portion 42, and that the less sharply inclined sealing surface 49 at the edge 50 is divergingly inclined relative to and in angular interference with the more sharply inclined heating surface 44.

Figure 10:
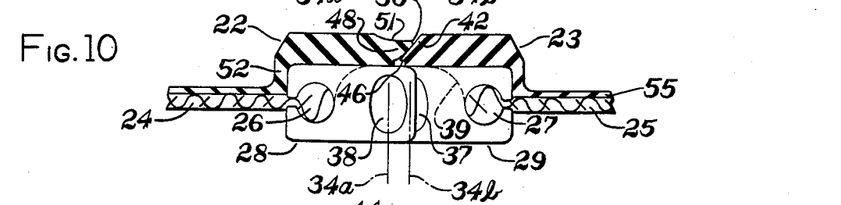

Further drawing together of the teeth and the sealing elements by the action of the slider, as shown in Fig. 10, progressively increases the lateral overlap of the engaging portions 32, 33 of the teeth and brings closer together their interlocking contact areas 37 and 38, and center lines 34a and 34b, respectively. At the same time, due largely to the angular interference and relative inclination of the surfaces 49, 44, the tapered marginal portion 48 of the sealing element 22 resiliently flexes and bends upwardly largely about the position of the center line 34a with both the blunt flat edge 50 and the sealing surface 49 sliding upwardly upon and resiliently pressing continuously against the seating surface 44. As the engaging portions of the teeth continue to approach their final position and overlapped interlocked relation, the sharpness of flexure and bending of the tapered marginal portion 48 increases somewhat and a limited amount of elastic deformation of its material and shape takes place due in part to the resistance of the sealing element 23 to undue distortion under the lateral pressure of the portion 48. This bending and elastic deformation causes the edge 50 to slide upwardly and causes an increase in the resilient pressure of the edge 50 against the seating surface 44, and also produces increased area of the sealing surface 49 in continuous sealing contact with the seating surface together with increased lateral pressure of the sealing surface against the seating surface.

In the final position of the sealing elements and final interlocked condition of the engaging portions of the teeth as shown in Fig. 11, the center lines 34a and 34b, respectively, coincide with one another and with the median line of engagement 34 of the slide fastener structure, while the tapered marginal portion 48 of the sealing element 22 is in its maximum resiliently flexed and elastically deformed condition and in its fully contacting sealing relation to the other sealing element 23. The resilient uniformly thick body part of the sealing element 22 trailing or immediately rearward of the fully flexed marginal portion 48 cooperates with the teeth 28 to brace and backingly support the latter portion 48 so as to facilitate its maintaining the desired substantially uniform lateral abutting pressure of its sealing surface 49 against the seating surface 44 of the other sealing element 23, and also to facilitate its maintaining the blunt flat edge 50 resiliently flexed and pressed slidingly against the seating surface 44 of the other sealing element 23 at the uppermost or outer region of the surface 44. The blunt flat edge 50 is positioned substantially at the level or approximately in the plane of the flat upper face of the sealing element 23 so as to avoid interfering with the freedom of entry of the engaged sealing elements into the slider when the closure is being opened. Due to the flexure and elastic deformation of the marginal portion 48, its upper surface 51, instead of being flat, has a slight inward or concave curvature.

The fully flexed marginal portion 48 has its sealing surface 49 pressed laterally continuously against and contacting the seating surface 44 throughout substantially its entire extent from top to bottom thereof as shown in Fig. 11, thus both contacting surfaces 49, 44 are upwardly and outwardly inclined to the same side of the median line 34 and at the same acute angle to the upper face of the interlocked teeth 28, 29 and the adjacent face of the stringers 24, 25. The sealing surface 49 not only exerts lateral abutting pressure substantially uniformly against the seating surface 44, but is in slidable relation thereto as is also the edge 50, whereby the seal is produced by lip-action flexure and sliding contact of the edge 50 against the seating surface 44 and by lateral abutting pressure of the sealing surface 49 against said surface 44.

Limited flexure and elastic deformation of the lower inner parts of the tapered marginal portions 42, 48 immediately at and in advance of the centerlines 34b, 34a (see Fig. 8) may occur substantially as indicated at "A" in Fig. 11, thereby facilitating the desired full contact and substantially uniform lateral abutting pressure of the sealing surface 49 against the seating surface 44, and the desired flexure and elastic deformation of the marginal portion 48 for effective sealing of the closure.

The sealing slide fastener structure in the closed condition resists effectively breaking of the seal under flexure and bending and twisting of the assembly as a whole, and under sharp and localized flexure and bending and twisting of the assembly, by virtue of its maintaining the lateral abutting pressure of the sealing elements 22, 23 against one another, the lip-action flexure and sliding contact of the edge 50 against the seating surface 44, and the relative sliding movement of the sealing surface 49 and the acutely inclined seating surface 44. The sealing slide fastener structure in the closed condition provides a lateral abutment seal together with a lip-action seal under zero fluid pressure differential at the two faces of the stringers or the wall of the article, and by virtue largely of the lateral abutment seal resists leakage when the fluid pressure within the article (for example, about 3 to 5 lbs. p.s.i.) exceeds that outside the article. The sealing slide fastener structure, because of the coaction of its lateral abutment seal and lip-action seal functions, resists effectively breaking of the seal when the fluid pressure outside the article is substantially greater than the internal fluid pressure (for example, an outer fluid pressure in excess of 9 lbs. p.s.i.) since as the outer pressure increases it causes an increase in the resilient pressure of the edge 50 against the seating surface 44; hence increased sealing action by the edge 50 without materially altering the lateral abutment seal. In fact, it has been found that under external pressures, the seal of the closure is maintained until the lateral pull of the stringers 24, 25, due to said pressure, is sufficient to force lateral separation of the engaged teeth 28, 29 to an extent such that the tapered marginal portions 42, 48 no longer contact one another i.e. until failure of the slide fastener part itself of the assembly takes place.

As shown in Fig. 12, the sealing slide fastener structure accommodates limited relative angular or hinging movement of the engaged teeth 28, 29 while maintaining the lateral abutment and lip-action seals of the closure. Thus, the improved sealing closure effectively maintains the continuity of its dual seal against water, air, gas and other flowable substances under pressure conditions at either or both faces of the wall of the article and under flexure of the adjacent margins at the opening in the wall of the article.

The improved sealing slide fastener structure is suitable for use in inflatable articles including inflatable flying suits, water-tight covers for instruments, radio and other apparatus, clothing, tents and shelters, overshoes and wading boots, exposure suits, material (dry and liquid) containers, and other related articles and structures requiring especially liquid and/or gas-tight separable closures capable of maintaining a seal under flexure, bending and twisting of the closure.

Variations may be made without departing from the scope of the invention as it is defined in the following claims.

We claim:

1. A sealing slide fastener structure comprising a pair of adjacent side-by-side flexible stringers of textile fabric material having an impervious layer of elastic material, slide fastener teeth mounted in series on adjacent edges of said stringers for interengagement of the teeth along the median line of engagement of the slide fastener structure to separably join the stringers, a pair of closing elements of elastic material and flat strip form each extending along a stringer and overlying and mounted on said teeth of the stringer at a face of the stringers for closing the latter, one of said closing elements including a flexure-resistant marginal portion thereof being adhesively bonded across the width thereof to the adjacent underlying teeth of a stringer and extending from the outer ends of such teeth to at least said median line of engagement of said structure, said marginal portion having a seating surface extending laterally in a direction away from said median line of engagement of said structure with the major part of said surface adjacent and disposed to one side of said median line and upwardly inclined at an acute angle relative to said face of the stringers, the other closing element comprising a body portion extending from the outer ends of the underlying adjacent teeth of the other stringer to at least said median line of engagement of said structure and merging with an elastic marginal portion which tapers to a thin edge and is of lesser cross-section and greater flexibility than the first said marginal portion and extends laterally in said direction to the free inner ends of the last said teeth and is disposed substantially entirely to said one side of said median line of engagement of said structure, said body portion being adhesively bonded throughout its width to the last said teeth, the tapered marginal portion having at its lower face a sealing surface extending from approximately said median line of engagement of said structure to said thin edge in spaced-apart relation to the last said teeth and in inclined relation to said seating surface with said sealing surface inclined relative to said face of the stringers at a lesser angle than that of said seating surface for angular interference therewith to provide sealing by lip-action flexure of said edge in sliding contact against said seating surface at said one side of said median line of engagement of said structure while opposing areas on the acutely inclined seating surface and on said sealing surface which trail said edge at said one side of said median line of engagement of said structure are maintained pressed toward and against one another in slidable laterally abutting sealing relation in the closed condition of said structure, and a slider having spaced-apart flanged plate elements embracing the exterior of the teeth at the other face of the stringers and embracing the exterior of said closing elements at the first said face of the stringers for drawing together said teeth into interengagement along said median line and drawing together said closing elements into their lip-action sealing and laterally abutting sealing relationship.

2. A sealing slide fastener structure as defined in claim 1 in which said seating surface of said one closing element has an acute angle of inclination relative to said face of the stringers within the range of from not less than 30° to a maximum of about 60°; in which said sealing surface of the other closing element has an angle of inclination relative to said face of the stringers within the range of from not less than 0° to a maximum of about 45°; and in which said angular interference of said surfaces is within the range of from not less than about 15° to a maximum of about 35°.

3. A sealing slide fastener structure as defined in claim 1 in which said seating surface of said one closing element has an acute angle of inclination relative to said face of the stringers of 50°; in which said sealing surface of the other closing element has an angle of inclination relative to said face of the stringers of 15°; and in which said angular interference of said surfaces is 35°.

4. A sealing closure for adjacent margins of an article, said closure comprising fastener means for mounting on said margins for separably joining the latter, and a pair of flexible closing elements overlying and mounted at least in part of said fastener means at a face of the said margins for closing the margins by an overlapping contacting relation of said elements at one side of the longitudinal center line of the closure when the latter is in the closed condition, one of the closing elements including a flexure-resistant marginal portion extending laterally of the closure and having its entire lower face overlying and contacting the underlying adjacent fastener means and having a seating surface extending, when the closure is in the open condition, laterally over said lower face and upwardly inclined at an acute angle relative to said face of the said margins, the major part of said seating surface being disposed to said one side of said longitudinal center line when the closure is in the closed condition, the other closing element contacting the underlying adjacent fastener means and having in the open condition of the closure a flexible marginal portion of elastic material tapering to a thin edge and extending laterally over the last said underlying adjacent fastener means toward said seating surface, the tapered marginal portion at its lower face presenting a sealing surface disposed, when the closure is in the closed condition, wholly to said one side of said longitudinal center line of the closure, said sealing surface being spaced in the open condition of the closure from said last said adjacent fastener means and extending to said thin edge in inclined relation to said seating surface with said sealing surface inclined relative to said face of the margins at a lesser angle than that of said seating surface for angular interference therewith upon closing of the closure to provide sealing by elastic flexure of said edge in sliding contact against said seating surface, while opposing areas on the acutely inclined seating surface and on said sealing surface which trail said edge are maintained pressed laterally toward and against one another in slidable abutting sealing relation in the closed condition of the closure.

5. A sealing closure for adjacent margins of an article, said closure comprising means including a plurality of fastener elements for mounting on each of said margins for separably joining the latter, and a pair of flexible closing elements of strip form extending along said margins and overlying and mounted on said fastener elements at a face of the said margins for closing the latter by an overlapping contacting relation of said closing elements at one side of the longitudinal center line of the closure when the latter is in the closed condition, one of said closing elements including a marginal portion thereof adhesively bonded across the full width thereof to the underlying adjacent fastener elements and said marginal portion having a seating surface extending laterally outward of the closure and upwardly inclined at an acute angle relative to said face of the said margins, the major part of said seating surface being disposed in the region of and to said one side of the said longitudinal center line when the closure is in the closed condition, the other closing element comprising a body portion merging with a flexible marginal portion of elastic material having substantially lesser lateral extent than that of said body portion and tapering to a thin edge, said body portion being adhesively bonded across its full width to the underlying fastener elements, the said tapered marginal portion extending in the open condition of the closure laterally from said body portion toward said seating surface in spaced relation to the last said underlying adjacent fastener elements and having at its lower face a sealing surface extending in the open condition of the closure to said thin edge in inclined relation to said seating surface with said sealing surface inclined relative to said face of the said margins at a lesser angle than that of said seating surface for angular interference therewith upon closing of the closure, the said tapered marginal portion extending in the closed condition of the closure laterally from approximately said longitudinal center line of the closure with the major part of said sealing surface disposed at said one side of said longitudinal center line, whereby sealing is effected by elastic flexure of said edge in sliding contact against said seating surface, while opposing areas on the acutely inclined seating surface and on said sealing surface which trail said edge are maintained pressed laterally toward one another in slidable abutting relation when said fastener elements are engaged one to the other and the closure is in its closed condition.

6. A sealing slide fastener closure comprising a pair of flexible attaching margins extending along the closure each to a side of the longitudinal center line of the closure when the latter is in the closed condition, slide fastener elements mounted on said attaching margins, and a pair of flexible closing elements of elastic material extending along and mounted on said attaching margins and contacting and secured to said fastener elements at a face of said attaching margins and said closing elements having marginal portions of said elastic material overlying said fastener elements, the marginal portion of one closing element contacting the underlying adjacent fastener elements and having a seating surface with the major part thereof, when the closure is in the closed condition, disposed adjacent and to one side of said center line of the closure and extending laterally in a direction away from said center line of the closure and outwardly inclined at an acute angle not less than about 30° and not more than about 60° relative to said underlying adjacent fastener elements and to said face of said attaching margins, the marginal portion of the other closing element having the major part thereof disposed in the closed condition of the closure to said one side of said center line of the closure, said marginal portion of said other closing element extending in the open condition of the closure laterally in said direction toward said seating surface and tapering to a thin edge and being of lesser cross-section and greater flexibility than the first said marginal portion and having at its lower face a sealing surface disposed in the closed condition of the closure adjacent and entirely to said one side of the center line of the closure, said sealing surface extending in the open condition of the closure laterally to said thin edge and being inclined relative to the underlying adjacent fastener elements and to said face of said attaching margins at an angle of not less than 0° and not more than about 45° and being inclined at an angle less than that of said seating surface for angular interference therewith upon closing of the closure, said marginal portion of said other closing element in the closed condition of the closure being elastically flexed with said thin edge resiliently pressing slidably and sealingly against said seating surface, while opposing areas on the acutely inclined seating surface and on said sealing surface which trail said edge are maintained pressed laterally toward and against one another in slidable abutting sealing relation.

7. A sealing slide fastener closure comprising a pair of flexible attaching margins extending along the closure each to a side of the longitudinal center line of the closure in the closed condition of the latter, slide fastener elements mounted on said attaching margins and having cooperating engaging portions, and a pair of flexible closing elements of elastic material extending along said attaching margins and contacting and bonded to said engaging portions of said fastener elements at a face of said margins and said closing elements having marginal portions thereof overlying said slide fastener elements with the major part of both said marginal portions in the closed condition of the closure disposed at and to one side of said center line of the closure, the marginal portion of one closing element contacting and being bonded to said engaging portions of the underlying adjacent fastener elements and having a seating surface with the major part thereof in the closed condition of the closure disposed at said one side of the said center line of the closure and extending laterally in a direction away from said center line of the closure and outwardly inclined at an acute angle of about 50° relative to the said underlying adjacent fastener elements and to said face of said attaching margins, the marginal portion of the other closing element comprising elastic material extending, when the closure is in the open condition, laterally in said direction toward said seating surface and tapering to a thin edge and being of lesser cross-section and greater flexibility than the first said marginal portion, the said marginal portion of said other closing element having at its lower face a sealing surface with the major part thereof disposed in the closed condition of the closure at said one side of the said center line of the closure, said sealing surface extending, when the closure is in the open condition, laterally in said direction to said thin edge and in spaced-apart relation to said engaging portions of the underlying adjacent fastener elements and also in inclined relation to said seating surface with said sealing surface inclined at an angle of about 15° relative to the adjacent fastener elements and to said face of said attaching margins for angular interference with said seating surface upon closing of the closure, said marginal portion of said other closing element in the closed condition of said closure being elastically flexed with said thin edge resiliently pressing slidably and sealingly against said seating surface, while opposing areas on the acutely inclined seating surface and on said sealing surface which trail said edge are maintained pressed laterally toward and against one another in slidable abutting sealing relation.

References Cited in the file of this patent

UNITED STATES PATENTS

| | | |
|---|---|---|
| 1,839,068 | Waschiczeck | Dec. 29, 1931 |
| 2,061,681 | Norton | Nov. 24, 1936 |
| 2,371,776 | Van Orman | Mar. 20, 1945 |
| 2,532,724 | Krupp | Dec. 5, 1950 |
| 2,545,817 | Krupp | Mar. 20, 1951 |

UNITED STATES PATENT OFFICE
CERTIFICATE OF CORRECTION

Patent No. 2,923,992  
February 9, 1960  
Howard H. Armstrong et al.

It is hereby certified that error appears in the printed specification of the above numbered patent requiring correction and that the said Letters Patent should read as corrected below.

Column 1, line 35, for "causing" read -- cause --; column 8, line 61, for "heating" read -- seating --; column 11, line 53, for "part of" read -- part on --.

Signed and sealed this 2nd day of August 1960.

(SEAL)  
Attest:  
KARL H. AXLINE  
Attesting Officer

ROBERT C. WATSON  
Commissioner of Patents